C. TAYLOR.
AUXILIARY SPRING OR BROKEN SPRING REPAIRER.
APPLICATION FILED SEPT. 7, 1912.
1,053,241.
Patented Feb. 18, 1913.
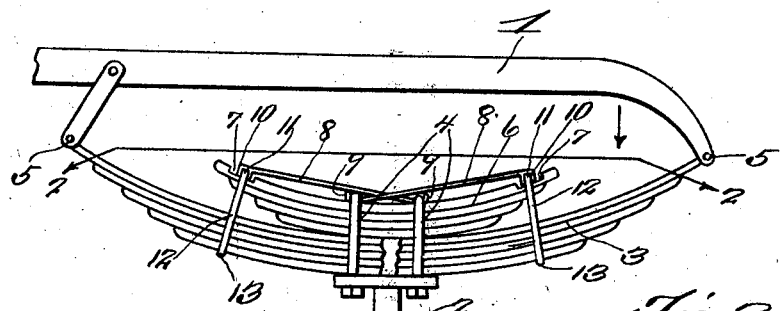
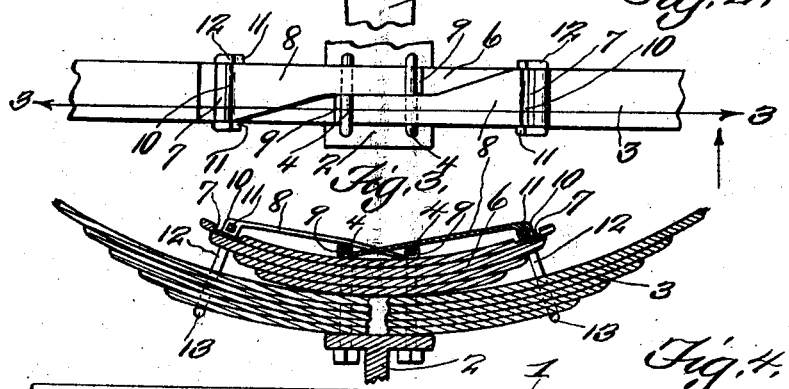
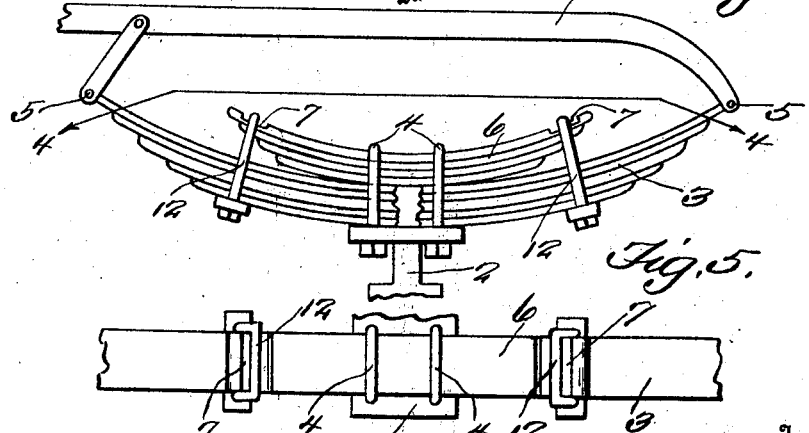
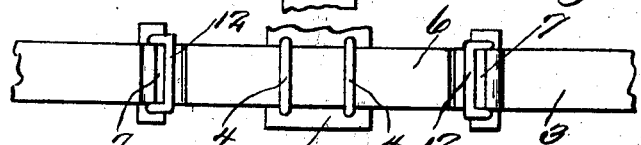
Witnesses
Inventor
C. Taylor,

UNITED STATES PATENT OFFICE.

CHESTER TAYLOR, OF PASO ROBLES, CALIFORNIA.

AUXILIARY SPRING OR BROKEN-SPRING REPAIRER.

1,053,241.  Specification of Letters Patent.  Patented Feb. 18, 1913.

Application filed September 7, 1912. Serial No. 719,102.

*To all whom it may concern:*

Be it known that I, CHESTER TAYLOR, a citizen of the United States, residing at Paso Robles, in the county of San Luis Obispo and State of California, have invented a new and useful Auxiliary Spring or Broken-Spring Repairer; and I do hereby declare the following to be a full, clear, and exact description of the invention, such as will enable others skilled in the art to which it appertains to make and use the same.

This invention relates to the art of vehicles, and more particularly to a new and useful auxiliary spring, attachable to the spring originally on the vehicle.

The invention aims, as one of the objects thereof, to provide an auxiliary spring, adapted not only for reinforcing the original springs, but for repairing the same, in case they become broken.

Another object of the invention is to provide novel, desirable and practical means for attaching the auxiliary spring in place.

In the drawings there is disclosed certain features, but in practical fields these features may necessitate alterations, to which the patentee is entitled, provided the alterations are comprehended within the scope of what is claimed.

The invention comprises further features and combination of parts, as hereinafter set forth, shown in the drawings and claimed.

In the drawings:—Figure 1 is a view showing the application of the improved auxiliary spring, and constructed in accordance with the invention. Fig. 2 is a plan view. Fig. 3 is a sectional view on line 3—3 of Fig. 2. Fig. 4 is a view in side elevation, illustrating a different method for applying the auxiliary spring. Fig. 5 is a sectional view through Fig. 4.

Referring more particularly to the drawings 1 designates a portion of the frame of a vehicle, on which the body and driving mechanism (not shown) are adapted to be mounted, while 2 denotes the axle bar adapted for carrying the axle bearings, whereas 3 marks one of the body springs, which is interposed between the bar 2 and the frame 1 in the usual manner. The spring 3 rests upon and is secured to the bar 2 by the clips 4, and has its ends linked, pivoted or otherwise connected to the frame 1, as at 5. The clips 4 also secure the auxiliary spring 6 upon the spring 3. The spring 6 not only reinforces the spring 3 originally, but also constitutes means for reinforcing, strengthening or repairing the spring 3, in case the same becomes unavoidably broken. The upper surface of the spring 6 at its ends is provided with recesses 7. Anchored under the clips 4 and extending in opposite directions are leaf metal members 8, which constitute supplemental devices for reinforcing the auxiliary spring 6 and thereby doubly strengthening the spring 3. These leaf metal members where they are arranged under the clips 4 are provided with shoulders 9, to contact with the clips, when a pulling strain is exerted on the members. The outer ends of the members terminate in sleeves rectangular in cross-section, which receive the rectangular portions 11 of the clips 12, which are U-shaped in cross section. The sleeves 10 are mounted in the recesses 7, which are of sufficient size to permit movement of the sleeves. The side bars of the clips 12 at their lower ends terminate in lateral lugs, to engage under the spring 3, thereby holding the end of the spring 6 properly in position, in order to reinforce the spring 3, whether the same has become broken or not. The rectangular sleeves prevent the clips 12 from twisting.

In Figs. 4 and 5 the leaf metal members are dispensed with, thereby simplifying the construction of and enabling one to observe that the structure may be varied.

From the foregoing it will be noted that there has been devised a novel, simple and efficient auxiliary spring or spring repairer, and one which has been found desirable and practical.

The invention having been set forth, what is claimed as new and useful is:—

In combination with a body spring, an emergency repairer for the body spring, comprising an auxiliary spring mounted on the body spring, clips for anchoring the central portion of the auxiliary spring firmly in position on the body spring, the auxiliary spring having its upper face at each end provided with recesses, leaf metal members secured under the clips and extending in opposite directions and provided with shoulders to contact with the clips, the leaf metal members terminating in their outer ends in sleeves rectangular in cross section mounted to move slightly in the recesses at each end of the auxiliary spring, U-shaped clips having rectangular portions received in the sleeves and straddling the body spring, the side bars of the U-shaped clips terminating in lateral ends to engage under the body spring.

In testimony whereof I have signed my name to this specification in the presence of two subscribing witnesses.

CHESTER TAYLOR.

Witnesses:
 A. NYBERG,
 J. H. VAN WORMER.